(12) United States Patent
     Su

(10) Patent No.: US 12,003,412 B2
(45) Date of Patent: Jun. 4, 2024

(54) METHOD AND APPARATUS FOR PROCESSING LINK STATE INFORMATION

(71) Applicant: Huawei Technologies Co., Ltd., Shenzhen (CN)

(72) Inventor: Yongzhe Su, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 118 days.

(21) Appl. No.: 17/650,688

(22) Filed: Feb. 11, 2022

(65) Prior Publication Data

US 2022/0166706 A1    May 26, 2022

Related U.S. Application Data

(63) Continuation of application No. PCT/CN2020/108587, filed on Aug. 12, 2020.

(30) Foreign Application Priority Data

Aug. 14, 2019   (CN) .......................... 201910749340.7

(51) Int. Cl.
     *H04L 45/28*    (2022.01)
     *H04L 45/00*    (2022.01)
     *H04L 45/122*   (2022.01)

(52) U.S. Cl.
     CPC ............ *H04L 45/28* (2013.01); *H04L 45/122* (2013.01); *H04L 45/22* (2013.01)

(58) Field of Classification Search
     CPC ..... H04L 12/703; H04L 45/28; H04L 45/122; H04L 45/22; H04L 45/00; H04L 45/02;
     (Continued)

(56) References Cited

U.S. PATENT DOCUMENTS 8,848,527 B2    9/2014   Cain
9,369,371 B2 *  6/2016   Filsfils ................. H04L 43/10
(Continued)

FOREIGN PATENT DOCUMENTS

CN    102006240 A    4/2011
CN    102025552 A    4/2011
(Continued)

OTHER PUBLICATIONS

Filsfils, C. et al., "Network Working Group", Internet-Draft, Intended status: Standards Track, Oct. 21, 2013, 36 Pages, Geneva, Switzerland.

(Continued)

*Primary Examiner* — Sargon N Nano
(74) *Attorney, Agent, or Firm* — Slater Matsil, LLP

(57) ABSTRACT

A method and an apparatus for processing link state information is provided. A first network device receives first link state information sent by a second network device, where the first link state information is link state information of a third network device; in response to receiving the first link state information, the first network device deletes second link state information that is received by the first network device from the second network device, where the second link state information carries a segment identifier of the third network device; and the first network device deletes, based on the first link state information, third link state information received from the second network device, where the third link state information carries information for computing a route to the third network device.

19 Claims, 5 Drawing Sheets

(58) Field of Classification Search
CPC ......... H04L 45/14; H04L 45/74; H04L 45/03; H04L 41/0668; H04L 69/40; H04L 45/04; H04L 45/50; H04L 45/24
USPC ........................................................ 709/223
See application file for complete search history.

(56) References Cited

U.S. PATENT DOCUMENTS

| | | | | |
|---|---|---|---|---|
| 9,660,897 | B1* | 5/2017 | Gredler | H04L 45/50 |
| 10,498,644 | B2* | 12/2019 | Raj | H04L 67/563 |
| 10,547,538 | B2* | 1/2020 | Chen | H04L 45/48 |
| 11,032,197 | B2* | 6/2021 | Nainar | H04L 45/28 |
| 11,088,939 | B1* | 8/2021 | Manur | H04L 45/124 |
| 2006/0159082 | A1* | 7/2006 | Cook | H04L 45/03 370/254 |
| 2010/0220736 | A1* | 9/2010 | Mohapatra | H04L 45/04 370/401 |
| 2014/0269727 | A1* | 9/2014 | Filsfils | H04L 47/724 370/392 |
| 2015/0055654 | A1* | 2/2015 | Song | H04L 45/74 370/392 |
| 2015/0139028 | A1 | 5/2015 | Lei et al. | |
| 2015/0263867 | A1* | 9/2015 | Chen | H04L 45/033 370/401 |
| 2015/0326675 | A1 | 11/2015 | Kini et al. | |
| 2016/0094398 | A1* | 3/2016 | Choudhury | H04L 45/42 370/254 |
| 2016/0095032 | A1* | 3/2016 | Varney | H04W 24/02 370/329 |
| 2017/0230276 | A1* | 8/2017 | Ceccarelli | H04L 45/64 |
| 2018/0019944 | A1 | 1/2018 | Peng et al. | |
| 2018/0077051 | A1* | 3/2018 | Nainar | H04L 45/745 |
| 2018/0262454 | A1* | 9/2018 | Zandi | H04L 51/214 |
| 2018/0262592 | A1* | 9/2018 | Zandi | H04L 67/55 |
| 2018/0351864 | A1* | 12/2018 | Jeganathan | H04L 45/021 |
| 2019/0058657 | A1* | 2/2019 | Chunduri | H04L 45/50 |
| 2021/0084009 | A1* | 3/2021 | Du | H04L 45/74 |
| 2022/0103463 | A1* | 3/2022 | Margaria | H04L 45/24 |

FOREIGN PATENT DOCUMENTS

| | | | |
|---|---|---|---|
| CN | 105704019 | A | 6/2016 |
| CN | 106549866 | A | 3/2017 |
| CN | 107241269 | A | 10/2017 |
| CN | 108702331 | A | 10/2018 |
| CN | 108768845 | A | 11/2018 |
| CN | 109194579 | A | 1/2019 |
| CN | 109218197 | A | 1/2019 |
| CN | 109218200 | A | 1/2019 |
| CN | 109257278 | A | 1/2019 |
| CN | 109510768 | A | 3/2019 |
| CN | 109873760 | A | 6/2019 |
| CN | 110266587 | A | 9/2019 |
| IN | 106878186 | A | 6/2017 |
| WO | 2015131560 | A1 | 9/2015 |
| WO | WO-2015131560 | A1 * | 9/2015 ......... H04L 41/0806 |

OTHER PUBLICATIONS

Psenak, P. et al., "OSPF Extensions for Segment Routing", draft-ietf-ospf-segment-routing-extensions-24, Dec. 14, 2017, 29 pages.
Moy, J., Ascend Communications, Inc., "OSPF Version 2", RFC2328, Apr. 1998, 244 pages.
Berger, L., et al., "The OSPF Opaque LSA Option", RFC5250, Jul. 2008, 17 pages.
Psenak, P. et al., "OSPFv2 Prefix/Link Attribute Advertisement", RFC 7684, Nov. 2015, 15 pages.

* cited by examiner

US 12,003,412 B2

METHOD AND APPARATUS FOR PROCESSING LINK STATE INFORMATION

CROSS-REFERENCE TO RELATED APPLICATIONS

This application is a continuation of International Application No. PCT/CN2020108587, filed on Aug. 12, 2020, which claims priority to Chinese Patent Application No. 201910749340.7, filed on Aug. 14, 2019. The disclosures of the aforementioned applications are hereby incorporated by reference in their entireties.

TECHNICAL FIELD

This application relates to the field of communications technologies, and in particular, to a method and an apparatus for processing link state information.

BACKGROUND

In a network, when a fault occurs on a path, traffic on the path may be switched to another path for transmission. For example, traffic is transmitted from a source node to a destination node along a path A. When all links to the destination node that include an intermediate node on the path A become faulty, the source node switches the traffic to a path B for transmission. The path B no longer includes the intermediate node. However, in a path switching process, a severe traffic packet loss is likely to occur. Consequently, network transmission reliability is reduced.

SUMMARY

Based on this, embodiments of this application provide a method and an apparatus for processing link state information, to reduce a traffic packet loss in a path switching process, thereby improving network transmission reliability.

According to a first aspect, an embodiment of this application provides a method for processing link state information. According to the method, a first network device receives first link state information sent by a second network device. The first link state information is link state information of a third network device, and the first link state information is used to indicate the first network device to delete second link state information of the third network device. The second link state information includes a segment identifier (SID) of the third network device. Further, the first network device may delete, based on the first link state information, third link state information received from the second network device, where the third link state information carries information for computing a route to the third network device. When the second link state information on the first network device is deleted, the first network device deletes the SID that is of the third network device and that is provided based on the second link state information, where the SID of the third network device is provided for the route from the first network device through the second network device to the third network device. When the third link state information on the first network device is deleted, the first network device deletes the route computed based on the third link state information, that is, the route from the first network device through the second network device to the third network device. Then, the first network device recomputes a route to the third network device, and the recomputed route does not include the second network device. In this case, the first network device can switch traffic from a path including the second network device to a path that does not include the second network device. Therefore, for the first link state information used to indicate the first network device to delete the second link state information and fourth link state information used to indicate the first network device to delete the third link state information, when in-order transmission of the first link state information and the fourth link state information cannot be ensured, even if the first network device has not received the fourth link state information from the second network device when receiving the first link state information, the first network device deletes the second link state information and the third link state information. This prevents the first network device from continuing to use the route to the third network device through the second network device to perform traffic forwarding when a link between the second network device and the third network device is faulty. In this way, a traffic packet loss is reduced, and network transmission reliability is improved.

In a possible design, the first link state information carries an indication identifier, and the indication identifier is used to indicate the network device that receives the first link state information, to delete the third link state information. Therefore, by adding the indication identifier to the first link state information, the second network device may indicate, to the first network device, whether the first network device is to synchronously delete the second link state information and the third link state information. In this way, a processing manner of route withdrawal can be more flexibly configured.

In some possible designs, the first network device may delete the third link state information when determining that the first link state information carries the indication identifier. Therefore, by adding the indication identifier to the first link state information, the second network device may indicate, to the first network device, whether the first network device is to synchronously delete the second link state information and the third link state information. In this way, a processing manner of route withdrawal can be more flexibly configured.

In some possible designs, the first link state information is carried in a link-state advertisement (LSA) defined according to the open shortest path first (OSPF) protocol, and the indication identifier is carried in an options field in a packet header of the LSA. It can be learned from above that, the second network device may advertise, to the first network device by using the options field in the packet header of the LSA, the indication identifier for indicating the first network device to synchronously delete the second link state information and the third link state information.

According to a second aspect, an embodiment of this application provides a method for processing link state information. According to the method, a first network device receives first link state information sent by a second network device. The first link state information carries information for computing a route to a third network device. Further, the first network device may determine, based on the first link state information, whether the first network device stores second link state information received from the second network device. The second link state information carries a SID of the third network device. When determining that the first network device stores the second link state information, the first network device updates a route to the third network device based on the first link state information. It can be learned from above that, when in-order transmission of the first link state information and the second link state information cannot be ensured, even if the first network device has not received the second link state information when receiving the first link state information, the first network device updates the route to the third network device based on the first link state information only when determining that the first network device receives and stores the second link state information. Therefore, the first network device not only can obtain, through updating based on the first link state information, the route to the third network device through the second network device, but also can create, in a forwarding table based on the SID carried in the second link state information, a forwarding entry corresponding to the route. In this way, the first network device can switch traffic from a path that does not include the second network device back to a path including the second network device. This avoids a case in which the first network device cannot use the route to the third network device through the second network device to perform traffic forwarding when a link between the second network device and the third network device recovers from a faulty state. In this way, a traffic packet loss is reduced, and network transmission reliability is improved.

In some possible designs, the first network device starts a timer when determining that the first network device does not store the second link state information. The first network device may determine, during timing of the timer, whether the first network device receives the second link state information sent by the second network device. It can be learned from above that, based on the timing operation of the timer, the first network device may wait after receiving the first link state information until receiving the second link state information.

In some possible designs, when determining that the first network device receives the second link state information before the timer expires, the first network device may update the route to the third network device based on the first link state information. It can be learned from above that, based on the timing operation of the timer, the first network device may update the route to the third network device based on the first link state information after receiving the second link state information.

In some possible designs, when determining that the first network device does not receive the second link state information even after the timer expires, the first network device may not update the route to the third network device based on the first link state information. It can be learned from above that, based on the timing operation of the timer, the first network device does not update the route to the third network device based on the first link state information before receiving the second link state information.

In some possible designs, the first link state information carries an indication identifier, and the indication identifier is used to indicate the network device that receives the first link state information, to determine, when updating the route to the third network device based on the first link state information, whether the network device stores the second link state information. Therefore, by adding the indication identifier to the first link state information, the second network device may indicate, to the first network device, whether the first network device synchronously stores the first link state information and the second link state information. In this way, a processing manner of route updating can be more flexibly configured.

In some possible designs, when determining that the first link state information carries the indication identifier, the first network device may determine whether the first network device stores the second link state information. Therefore, by adding the indication identifier to the first link state information, the second network device may indicate, to the first network device, whether the first network device synchronously stores the first link state information and the second link state information. In this way, a processing manner of route updating can be more flexibly configured.

In some possible designs, the first link state information is carried in a link-state advertisement (LSA) defined according to the OSPF protocol, and the indication identifier is carried in an option options field in a packet header of the LSA. It can be learned from above that, the second network device may advertise, to the first network device by using the options field in the packet header of the LSA, the indication identifier for indicating the first network device to synchronously store the first link state information and the second link state information.

According to a third aspect, an embodiment of this application provides a first network device, which includes a receiving unit and a processing unit. The receiving unit is configured to receive first link state information sent by a second network device, where the first link state information is link state information of a third network device. The processing unit is configured to: in response to receiving the first link state information, delete second link state information that is received by the first network device from the second network device, where the second link state information carries a segment identifier of the third network device. The processing unit is further configured to delete, based on the first link state information, third link state information received from the second network device, where the third link state information carries information for computing a route to the third network device.

In some possible designs, the first link state information carries an indication identifier, and the indication identifier is used to indicate the network device that receives the first link state information, to delete the third link state information.

In some possible designs, the processing unit is specifically configured to: determine that the first link state information carries the indication identifier, and delete the third link state information.

In some possible designs, the first link state information is carried in a link-state advertisement (LSA) defined according to the open shortest path first (OSPF) protocol, and the indication identifier is carried in an options field in a packet header of the LSA.

It should be noted that the first network device provided in the third aspect corresponds to the method provided in the first aspect. Therefore, for various possible implementations of the first network device provided in the third aspect and technical effects achieved according to the possible implementations, refer to the descriptions of the method provided in the first aspect.

According to a fourth aspect, an embodiment of this application provides a first network device, which includes a receiving unit, a determining unit, and a processing unit. The receiving unit is configured to receive first link state information sent by a second network device, where the first link state information carries information for computing a route to a third network device. The determining unit is configured to determine, based on the first link state information, whether the first network device stores second link state information received from the second network device, where the second link state information carries a segment identifier of the third network device. The processing unit is configured to: when it is determined that the first network device stores the second link state information, update a route to the third network device based on the first link state information.

In some possible designs, the processing unit is further configured to start a timer when the determining unit determines that the first network device does not store the second link state information. The determining unit is further configured to determine, during timing of the timer, whether the first network device receives the second link state information sent by the second network device.

In some possible designs, the processing unit is further configured to: when the determining unit determines that the first network device receives the second link state information before the timer expires, update the route to the third network device based on the first link state information.

In some possible designs, the processing unit is further configured to: when the determining unit determines that the first network device does not receive the second link state information even after the timer expires, not update the route to the third network device based on the first link state information.

In some possible designs, the first link state information carries an indication identifier, and the indication identifier is used to indicate the network device that receives the first link state information, to determine, when updating the route to the third network device based on the first link state information, whether the network device stores the second link state information.

In some possible designs, the determining unit is specifically configured to: when determining that the first link state information carries the indication identifier, determine whether the first network device stores the second link state information.

In some possible designs, the first link state information is carried in a link-state advertisement (LSA) defined according to the OSPF protocol, and the indication identifier is carried in an options field in a packet header of the LSA.

It should be noted that the first network device provided in the fourth aspect corresponds to the method provided in the second aspect. Therefore, for various possible implementations of the first network device provided in the fourth aspect and technical effects achieved according to the possible implementations, refer to the descriptions of the method provided in the second aspect.

According to a fifth aspect, an embodiment of this application further provides a network device. The network device includes a memory and a processor. The memory is configured to store program code. The processor is configured to run instructions in the program code to enable the network device to perform the method according to any implementation of the first aspect or any implementation of the second aspect.

According to a sixth aspect, an embodiment of this application further provides a computer program product. When the computer program product is run on a computer, the computer is enabled to perform the method according to any implementation of the first aspect or any implementation of the second aspect.

According to a seventh aspect, an embodiment of this application further provides a computer-readable storage medium. The computer-readable storage medium stores instructions. When the instructions are run on a computer or a processor, the computer or the processor is enabled to perform the method according to any implementation of the first aspect or any implementation of the second aspect.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and an ordinary person skilled in the art may derive other drawings from these accompanying drawings.

DETAILED DESCRIPTION OF ILLUSTRATIVE EMBODIMENTS

The following describes the embodiments of this application with reference to accompanying drawings.

Figure 1:
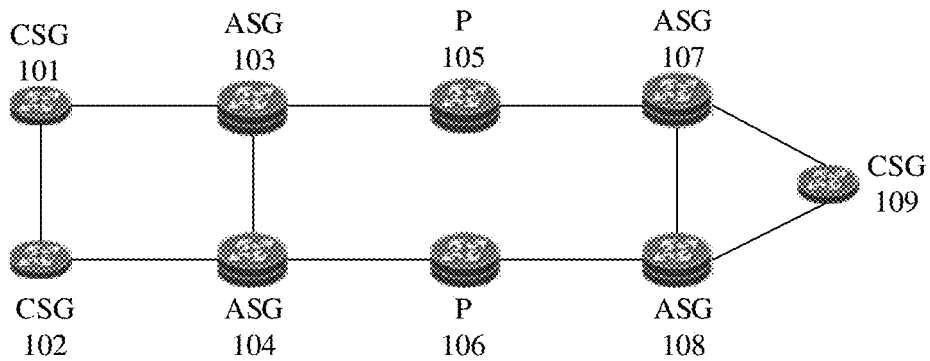
FIG. 1 is a schematic diagram of a network system framework in an application scenario according to an embodiment of this application.

For example, in a scenario example shown in FIG. 1, when a link between an ASG (ASG) 103 and a provider (P) device 105 and/or a link between the ASG 103 and an ASG 104 are/is not faulty, a path from the ASG 103 to a CSG 109 is reachable, and traffic is transmitted through a segment routing (SR) tunnel A from a cell site gateway (CSG) 101 to the CSG 109. Nodes along the SR tunnel A include the CSG 101, the ASG 103, the P device 105, an ASG 107, and the CSG 109. When both the link between the ASG 103 and the P device 105 and the link between the ASG 103 and the ASG 104 are faulty, the path from the ASG 103 to the CSG 109 is unreachable, and the CSG 101 may switch the traffic from the SR tunnel A to an SR tunnel B for transmission. Nodes along the SR tunnel B include the CSG 101, a CSG 102, the ASG 104, a P 106, an ASG 108, and the CSG 109. In addition, after the CSG 101 switches the traffic from the SR tunnel A to the SR tunnel B for transmission, if the link between the ASG 103 and the P device 105 and/or the link between the ASG 103 and the ASG 104 recover/recovers from a faulty state, the path from the ASG 103 to the CSG 109 is reachable, and the CSG 101 may switch the traffic from the SR tunnel B back to the SR tunnel A for transmission.

In some cases, for example, the open shortest path first (OSPF) protocol is used in a network, when both the link between the ASG 103 and the P device 105 and the link between the ASG 103 and the ASG 104 are faulty, the ASG 103 sends two different types of link state information to the CSG 101, to indicate the CSG 101 to no longer use the SR tunnel A to send traffic to the CSG 109. One type of link state information, that is, link state information A, is used to indicate the CSG 101 to delete link state information E previously received from the ASG 103. The link state information E carries a SID of the CSG 109. The link state information A may be carried in an opaque link-state advertisement (LSAt) defined according to the OSPF, and sent through the opaque LSA. The other type of link state information, that is, link state information B, is used to indicate the CSG 101 to delete link state information F previously received from the ASG 103. The link state information B carries information for computing a route to the CSG 109. The link state information B may be carried in a network summary LSA or another type of LSA defined according to the OSPF, and sent through the network summary LSA or the another type of LSA. Similarly, when the link between the ASG 103 and the P device 105 and/or the link between the ASG 103 and the ASG 104 recover/recovers from a faulty state, the ASG 103 also sends two different types of link state information to the CSG 101, to indicate the CSG 101 to use the SR tunnel A again to send traffic to the CSG 109. One type of link state information, that is, link state information C, carries the SID of the CSG 109, and is used to indicate the CSG 101 to provide the SID of the CSG 109 for the route to the CSG 109 based on the link state information C. The link state information C may be carried in an opaque LSA defined according to the OSPF. The other type of link state information, that is, link state information D, carries the information for computing the route to the CSG 109, and is used to indicate the CSG 101 to update a route to the CSG 109 based on the link state information D. The link state information D may be carried in a network summary LSA or another type of LSA defined according to the OSPF.

Because the link state information A and the link state information B are carried in different packets for transmission, in-order transmission of the link state information A and the link state information B cannot be ensured. Therefore, when both the link between the ASG 103 and the P device 105 and the link between the ASG 103 and the ASG 104 are faulty, the CSG 101 may receive the link state information A before the link state information B, or may receive the link state information B before the link state information A.

When receiving the link state information A, the CSG 101 deletes, from a link state database (LSDB) of the CSG 101, the link state information E previously received from the ASG 103, where the link state information E carries the SID of the CSG 109. However, if the CSG 101 has not received the link state information B at this time, the LSDB of the CSG 101 also stores the link state information F previously received from the ASG 103, where the link state information F carries the information for computing the route to the CSG 109. When the link state information F is not deleted from the LSDB, the CSG 101 does not delete the route that is to the CSG 109 through the ASG 103 and that is computed based on the link state information F. The CSG 101 does not recompute, based on link state information that is recorded in the LSDB and that is sent by the ASG 104, the route to the CSG 109 through the ASG 104, either. Therefore, the CSG 101 does not switch the traffic from the SR tunnel A to the SR tunnel B for forwarding. When the link state information E is deleted from the LSDB, the CSG 101 deletes the SID of the CSG 109 that corresponds to the route to the CSG 109 through the ASG 103. Therefore, the CSG 101 can no longer use the SR tunnel A to perform traffic forwarding. The CSG 101 does not delete the link state information F from the LSDB of the CSG 101 until the CSG 101 receives the link state information B. After the link state information F is deleted from the LSDB, the CSG 101 deletes the route that is to the CSG 109 through the ASG 103 and that is computed based on the link state information F. Then, the CSG 101 computes the route to the CSG 109 through the ASG 104 based on the link state information sent by the ASG 104, to switch the traffic from the SR tunnel A to the SR tunnel B for forwarding. It can be learned from above that, because the in-order transmission of the link state information A and the link state information B cannot be ensured, if the CSG 101 receives the link state information A before the link state information B, during a time period in which the CSG 101 receives the link state information A but has not received the link state information B, the CSG 101 can no longer use the SR tunnel A to perform traffic forwarding, and cannot switch the traffic from the SR tunnel A to the SR tunnel B for forwarding, either. Consequently, a traffic packet loss is caused.

Further, because the link state information C and the link state information D are also carried in different packets for transmission, in-order transmission of the link state information C and the link state information D cannot be ensured. Therefore, when the link between the ASG 103 and the P device 105 and/or the link between the ASG 103 and the ASG 104 recover/recovers from a faulty state, the CSG 101 may receive the link state information C before the link state information D, or may receive the link state information D before the link state information C.

When receiving the link state information D, the CSG 101 records the link state information D in the LSDB of the CSG 101. When the link state information D has been recorded in the LSDB, the CSG 101 computes, based on the link state information D, the route to the CSG 109 through the ASG 103, and updates the route to the CSG 109 through the ASG 104 to the route from the ASG 103 to the CSG 109. In this way, the CSG 101 no longer uses the SR tunnel B to perform traffic forwarding. However, if the CSG 101 has not received the link state information C at this time, the link state information C is not recorded in the LSDB of the CSG 101. In this case, the CSG 101 cannot provide, based on the link state information C, the SID of the CSG 109 for the route to the CSG 109 through the ASG 103. Therefore, the CSG 101 cannot use the SR tunnel A to perform traffic forwarding, either. The CSG 101 records the link state information C in the LSDB of the CSG 101 only after receiving the link state information C. The CSG 101 can provide, based on the link state information C, the SID of the CSG 109 for the route to the CSG 109 through the ASG 103 only when the link state information C has been recorded in the LSDB. Therefore, the CSG 101 can use the SR tunnel A to perform traffic forwarding. It can be learned from above that, because the in-order transmission of the link state information C and the link state information D cannot be ensured, if the CSG 101 receives the link state information D before the link state information C, during a time period in which the CSG 101 receives the link state information D but has not received the link state information C, the CSG 101 can no longer use the SR tunnel B to perform traffic forwarding, and cannot switch the traffic from the SR tunnel B back to the SR tunnel A for forwarding, either. Consequently, a traffic packet loss is caused.

To avoid the traffic packet loss that is caused because the link state information A is received before the link state information B, the CSG 101 may delete the link state information E and the link state information F from the LSDB of the CSG 101 when receiving the link state information A. In this way, even if the CSG 101 has not received the link state information B at this time, both the link state information E and the link state information F in the LSDB of the CSG 101 may be deleted. Therefore, the CSG 101 not only deletes the SID of the CSG 109 that is provided for the route to the CSG 109 through the ASG 103, but also deletes the route to the CSG 109 through the ASG 103. This avoids a case in which the CSG 101 continues to use the SR tunnel A to perform traffic forwarding when a link between the ASG 103 and the CSG 109 is faulty, thereby avoiding a traffic packet loss. Further, the CSG 101 computes, based on the link state information that is sent by the ASG 104 and that is recorded in the LSDB, the route to the CSG 109 through the ASG 104, and provides the SID of the CSG 109 for the route to the CSG 109 through the ASG 104. In this way, the CSG 101 can switch the traffic from the SR tunnel A to the SR tunnel B for forwarding. It can be learned from above that, when the in-order transmission of the link state information A and the link state information B cannot be ensured, even if the CSG 101 receives the link state information A before the link state information B, during the time period in which the CSG 101 receives the link state information A but has not received the link state information B, the CSG 101 can switch the traffic from the SR tunnel A to the SR tunnel B for forwarding, thereby avoiding the traffic packet loss.

To avoid the packet loss problem that is caused because the link state information D is received before the link state information C, after receiving the link state information D, the CSG 101 may determine whether the link state information C has been recorded in the LSDB of the CSG 101. If the CSG 101 has received the link state information C at this time, and the link state information C has been recorded in the LSDB of the CSG 101, the CSG 101 may record the link state information D in the LSDB of the CSG 101. If the CSG 101 has not received the link state information C at this time, the CSG 101 records the link state information D in the LSDB of the CSG 101 after the link state information C has been recorded in the LSDB of the CSG 101. In this way, even if the CSG 101 receives the link state information D before the link state information C, the link state information D is recorded in the LSDB of the CSG 101 after the link state information C has been recorded. Therefore, when updating the route based on the LSDB, the CSG 101 not only can update the route to the CSG 109 to the route to the CSG 109 through the ASG 103 based on the link state information D, but also can provide the SID of the CSG 109 for the route to the CSG 109 through the ASG 103 based on the link state information C. In this way, the CSG 101 can switch the traffic back to the SR tunnel A for forwarding. Therefore, when the in-order transmission of the link state information C and the link state information D cannot be ensured, even if the CSG 101 receives the link state information D before the link state information C, during the time period in which the CSG 101 receives the link state information D but has not received the link state information C, the CSG 101 can continue to use the SR tunnel B to perform traffic forwarding, thereby avoiding the traffic packet loss.

It should be noted that the network shown in FIG. 1 may be an OSPF network. For example, the ASG 103 and the ASG 104 may be devices at a boundary between two OSPF areas. For example, the CSG 101, the CSG 102, the ASG 103, and the ASG 104 are included in an area 1, and the ASG 103, the ASG 104, the P 105, the P 106, the ASG 107, and the ASG 108 are included in an area 2. For another example, the ASG 103 and the ASG 104 may be devices at a boundary between two OSPF processes. For example, the CSG 101, the CSG 102, the ASG 103, and the ASG 104 are included in an OSPF process 1, and the ASG 103, the ASG 104, the P 105, the P 106, the ASG 107, and the ASG 108 are included in an OSPF process 2. In addition, the network shown in FIG. 1 may be an intermediate system to intermediate system (IS-IS) network.

It can be understood that the foregoing scenario is merely a scenario example provided in this embodiment of this application, and this embodiment of this application is not limited to this scenario.

Figure 2:
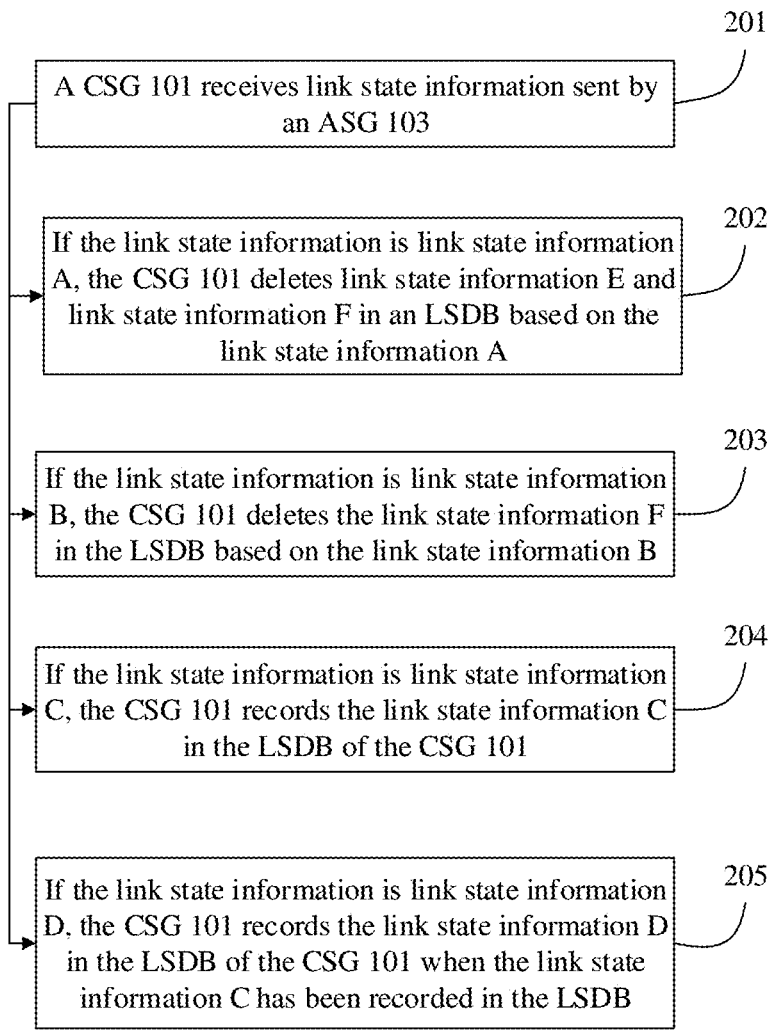
FIG. 2 is a schematic flowchart of a method for processing link state information according to an embodiment of this application.

With reference to the scenario shown in FIG. 1, an embodiment of this application provides a method 200 for processing link state information. As shown in FIG. 2, the method 200 may include the following steps.

201: The CSG 101 receives link state information sent by the ASG 103.

In an SR network, when a link from the ASG 103 to the CSG 109 is faulty, the ASG 103 may send, to the CSG 101, link state information A used to indicate the CSG 101 to delete link state information E, and the ASG 103 also sends link state information B used to indicate the CSG 101 to delete link state information F. The link state information E and the link state information F are sent by the ASG 103 to the CSG 101, and have been recorded in an LSDB of the CSG 101. The link state information E carries a SID of the CSG 109, and the link state information F carries information for computing a route to the CSG 109. The information for computing the route to the CSG 109 may include a device identifier of the CSG 109, a device identifier of the ASG 103, and the like. The device identifier of the CSG 109 may be an Internet Protocol (IP) address of the CSG 109. The device identifier of the ASG 103 may be an IP address of the ASG 103.

When the fault of the link from the ASG 103 to the CSG 109 is rectified, the ASG 103 may send, to the CSG 101, link state information C carrying the SID of the CSG 109, and may also send, to the CSG 101, link state information D used to indicate the CSG 101 to update a route to the CSG 109. The link state information D carries information for computing the route to the CSG 109. The information for computing the route to the CSG 109 may include a device identifier of the CSG 109, a device identifier of the ASG 103, and the like. The device identifier of the CSG 109 may be an IP address of the CSG 109, and the device identifier of the ASG 103 may be an IP address of the ASG 103.

It can be understood that, because the link state information A and the link state information B are carried in two different packets and sent through the packets, in-order transmission of the link state information A and the link state information B cannot be ensured. The ASG 103 may send the link state information A and the link state information B at the same time, may send the link state information A before the link state information B, or may send the link state information B before the link state information A. The CSG 101 may receive the link state information A and the link state information B at the same time, may receive the link state information A before the link state information B, or may receive the link state information B before the link state information A. In addition, because the link state information C and the link state information D are carried in two different packets and sent through the packets, in-order transmission of the link state information C and the link state information D cannot be ensured. The ASG 103 may send the link state information C and the link state information D at the same time, may send the link state information C before the link state information D, or may send the link state information D before the link state information C. The CSG 101 may receive the link state information C and the link state information D at the same time, may receive the link state information C before the link state information D, or may receive the link state information D before the link state information C.

For example, a network in which the CSG 101 and the ASG 103 are located may be an OSPF network, and the link state information sent by the ASG 103 to the CSG 101 may be carried in an LSA defined according to the OSPF protocol. Specifically, the link state information A, the link state information C, and the link state information E may be carried in an opaque LSA and sent by the ASG 103 to the CSG 101. The link state information B, the link state information D, and the link state information F may be carried in a router LSA, a network LSA, a network summary LSA, an autonomous system boundary router (ASBR) summary LSA, an autonomous system (AS) external LSA, or a not-so-stubby area (NSSA for short) LSA, and sent by the ASG 103 to the CSG 101.

In some implementations, if the network in which the CSG 101 and the ASG 103 are located is an OSPF network, the ASG 103 may be a device at a boundary between two OSPF areas or a device at a boundary between two OSPF processes. For example, both the CSG 101 and the ASG 103 are located in an OSPF area 1, and the ASG 103 is also located in an OSPF area 2. The ASG 103 receives, from the OSPF area 1, traffic sent by the CSG 101, and sends the traffic to the OSPF area 2, so that the traffic is transmitted to the CSG 109. For another example, both the CSG 101 and the ASG 103 exist in an OSPF process 1, and the ASG 103 also exists in an OSPF process 2. The ASG 103 receives, from the OSPF process 1, traffic sent by the CSG 101, and sends the traffic to the OSPF process 2, so that the traffic is transmitted to the CSG 109.

In addition, the network in which the CSG 101 and the ASG 103 are located may alternatively be an IS-IS network. In this case, the link state information sent by the ASG 103 to the CSG 101 may be carried in a link state packet (LSP) defined according to the IS-IS protocol.

202: If the link state information is the link state information A, the CSG 101 deletes the link state information E and the link state information F from the LSDB based on the link state information A.

When the LSDB of the CSG 101 stores the link state information F, a route 1 to the CSG 109 through the ASG 103 is recorded in a routing table of the CSG 101. When the LSDB of the CSG 101 stores the link state information E, a SID of the CSG 109 is recorded for the route 1 in the routing table of the CSG 101, and a forwarding entry 1 is recorded in a forwarding table of the CSG 101. The forwarding entry 1 includes the SID of the CSG 109 and a next-hop network device of the CSG 101 in the route 1. In this way, the CSG 101 can use the SR tunnel A to perform traffic forwarding When receiving the link state information A, the CSG 101 may delete the link state information E and the link state information F from the LSDB of the CSG 101. The link state information A may be used to indicate the CSG 101 to delete link state information about the CSG 109 that is stored in the CSG 101, that is, the link state information E and the link state information F. In this case, the link state information A may be considered as link state information of the CSG 109. In this way, even if the CSG 101 has not received the link state information B at this time, both the link state information E and the link state information F may be deleted from the LSDB of the CSG 101. When the link state information E is deleted from the LSDB of the CSG 101, the SID of the CSG 109 recorded for the route 1 is deleted from the routing table of the CSG 101. When no SID of the CSG 109 is recorded for the route 1, the forwarding entry 1 is also deleted from the forwarding table of the CSG 101. In this way, the CSG 101 no longer uses the SR tunnel A to perform traffic forwarding. When the link state information F is deleted from the LSDB of the CSG 101, the route 1 is deleted from the routing table of the CSG 101. Then, the CSG 101 computes a route 2 to the CSG 109 through the ASG 104 based on link state information that is sent by the ASG 104 and that is recorded in the LSDB, records the route 2 in the routing table, records a SID of the CSG 109 for the route 2 in the routing table, and creates a forwarding entry 2 in the forwarding table. The SID of the CSG 109 and a next hop of the CSG 101 in the route 2 are recorded in the forwarding entry 2. In this way, the CSG 101 can use the SR tunnel B to perform traffic forwarding. It can be learned from above that, when the in-order transmission of the link state information A and the link state information B cannot be ensured, even if the CSG 101 receives the link state information A before the link state information B, during a time period in which the CSG 101 receives the link state information A but has not received the link state information B, the CSG 101 can switch traffic from the SR tunnel A to the SR tunnel B for forwarding, thereby avoiding a traffic packet loss.

In some implementations, the link state information A may carry a first indication identifier, to indicate the CSG 101 to delete the link state information F from the LSDB. After the CSG 101 receives the link state information A, if the CSG 101 reads the first indication identifier from the link state information A, the CSG 101 may delete the link state information E from the LSDB of the CSG 101 based on the link state information A, and may also delete the link state information F from the LSDB of the CSG 101 based on the first indication identifier in the link state information A. If the CSG 101 cannot read the first indication identifier from the link state information A, the CSG 101 may delete the link state information E from the LSDB of the CSG 101 based on the link state information A, without deleting the link state information F from the LSDB of the CSG 101 based on the link state information A. It can be learned from above that, by adding the first indication identifier to the link state information A, the ASG 103 may indicate, to the CSG 101, whether the CSG 101 is to synchronously delete the link state information E and the link state information F. In this way, a processing manner of route withdrawal can be more flexibly configured.

If the link state information A is carried in a first LSA defined according to the OSPF protocol and sent through the first LSA, the first indication identifier may be carried in an LSA header of the first LSA. With reference to a description in Internet Engineering Task Force (IETF) Request for Comments (RFC) 2328, the first LSA may use an LSA header shown in FIG. 3. The first indication identifier may be carried in an options field in the LSA header. With reference to a description in IETF RFC 5250, the options field in the LSA header of the first LSA may use a structure shown in FIG. 4. An external attributes bit (EA bit) has been explicitly deprecated. Therefore, in the options field in the LSA header of the first LSA, an EA bit may be replaced by an SR bit, and the SR bit is used to carry the first indication identifier. Specifically, if the SR bit in the first LSA is set, the link state information A carries the first indication identifier. If the SR bit in the first LSA is not set, the link state information A does not carry the first indication identifier.

Figure 3:
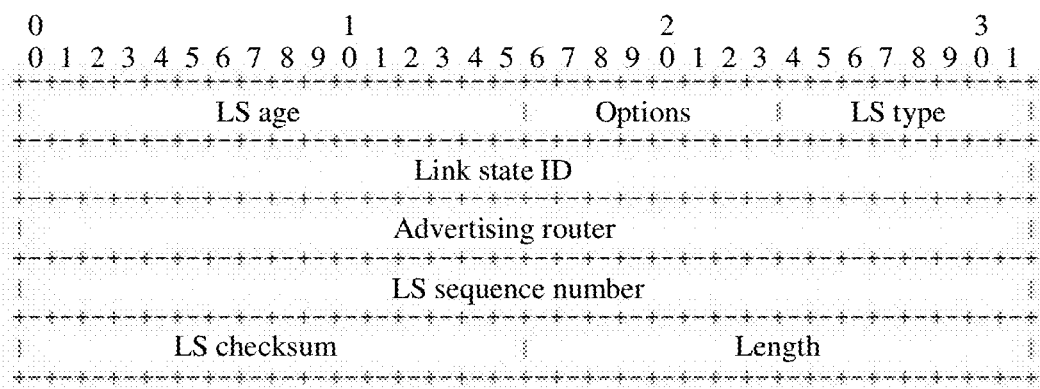
FIG. 3 is a schematic structural diagram of an LSA header according to an embodiment of this application.
Figure 4:
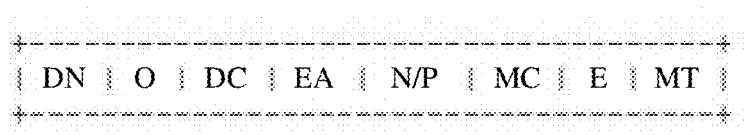
FIG. 4 is a schematic structural diagram of an options field in an LSA header according to an embodiment of this application.

It should be noted that the LSA header shown in FIG. 3 includes a link state age (LS age) field, an options field, a link state type (LS type), a link state identifier (link state ID) field, an advertising router field, a link state sequence number (LS sequence number), a link state checksum (LS checksum), and a length field. The options field shown in FIG. 4 includes a DN bit (used to prevent a loop), an O bit (used to identify whether an opaque LSA is to be received), an EA bit (used to identify whether an external attributes LSA is to be received), a DC bit (used to identify a circuit for router processing), and an N/P bit (used to identify an LSA whose processing type is 7), an MC bit (used to identify whether a multicast packet is to be forwarded), an E bit (used to identify an LSA flooding mode), and an MT bit (used to identify a multi-topology capability).

203: If the link state information is the link state information B, the CSG 101 deletes the link state information F from the LSDB based on the link state information B.

When receiving the link state information B, the CSG 101 may delete the link state information F from the LSDB of the CSG 101. When the link state information F is deleted from the LSDB, the route 1 is deleted from the routing table of the CSG 101. Then, the CSG 101 computes the route 2 based on the link state information that is sent by the ASG 104 and that is recorded in the LSDB, records the route 2 in the routing table, records the SID of the CSG 109 for the route 2 in the routing table, and creates the forwarding entry 2 in the forwarding table. In this way, the CSG 101 can use the SR tunnel B to perform traffic forwarding. It can be learned from above that, when the in-order transmission of the link state information A and the link state information B cannot be ensured, even if the CSG 101 receives the link state information B before the link state information A, during a time period in which the CSG 101 receives the link state information B but has not received the link state information A, the CSG 101 can switch the traffic from the SR tunnel A to the SR tunnel B for forwarding, thereby avoiding a traffic packet loss.

In some implementations, the link state information B may carry a second indication identifier, to indicate the CSG 101 to delete the link state information E from the LSDB. After the CSG 101 receives the link state information B, if the CSG 101 reads the second indication identifier from the link state information B, the CSG 101 may delete the link state information F from the LSDB of the CSG 101 based on the link state information B, and may also delete the link state information E from the LSDB of the CSG 101 based on the second indication identifier in the link state information B. Alternatively, the CSG 101 may ignore the second indication identifier to avoid deleting the link state information E from the LSDB of the CSG 101 based on the second indication identifier in the link state information B. If the CSG 101 cannot read the second indication identifier from the link state information B, the CSG 101 may delete the link state information F from the LSDB of the CSG 101 based on the link state information B, without deleting the link state information E from the LSDB of the CSG 101 based on the link state information B. It can be learned from above that, by adding the second indication identifier to the link state information B, the ASG 103 may indicate, to the CSG 101, whether the CSG 101 is to synchronously delete the link state information E and the link state information F. In this way, a processing manner of route withdrawal can be more flexibly configured.

If the link state information B is carried in a second LSA defined according to the OSPF protocol, the second indication identifier may be carried in an LSA header of the second LSA. With reference to the description in IETF RFC 2328, the second LSA may use the LSA header shown in FIG. 3. The second indication identifier may be carried in an options field in the LSA header of the second LSA. With reference to the description in IETF RFC 5250, the options field in the LSA header of the second LSA may use the structure shown in FIG. 4. The EA bit has been explicitly deprecated. Therefore, in the options field in the LSA header of the second LSA, an EA bit may be replaced by an SR bit, and the SR bit is used to carry the second indication identifier. Specifically, if the SR bit in the second LSA is set, the link state information B carries the second indication identifier. If the SR bit in the second LSA is not set, the link state information B does not carry the second indication identifier.

204: If the link state information is the link state information C, the CSG 101 records the link state information C in the LSDB of the CSG 101.

When receiving the link state information C, the CSG 101 may record the link state information C in the LSDB of the CSG 101. If the CSG 101 has not received the link state information D at this time, the CSG 101 does not update the route 1 computed based on the link state information D to the routing table, and therefore does not delete the route 2 and the SID of the CSG 109 from the routing table nor delete the forwarding entry 2 from the forwarding table. In this way, the CSG 101 continues to use the SR tunnel B to perform traffic forwarding. It can be learned from above that, when the in-order transmission of the link state information C and the link state information D cannot be ensured, even if the CSG 101 receives the link state information C before the link state information D, during a time period in which the CSG 101 receives the link state information C but has not received the link state information D, the CSG 101 continues to use the SR tunnel B to perform traffic forwarding, thereby avoiding a traffic packet loss.

In some implementations, the link state information C may carry a third indication identifier, to indicate the CSG 101 to synchronously record the link state information C and the link state information D in the LSDB. After the CSG 101 receives the link state information C, if the CSG 101 reads the third indication identifier from the link state information C, the CSG 101 may synchronously record, based on the third indication identifier in the link state information C, the link state information C and the link state information D in the LSDB when both the link state information C and the link state information D are received. Alternatively, the CSG 101 may ignore the third indication identifier, and record the link state information C in the LSDB of the CSG 101, without determining whether the link state information D has been received at this time and ensuring that both the link state information C and the link state information D are recorded in the LSDB of the CSG 101. If the CSG 101 cannot read the third indication identifier from the link state information C, the CSG 101 may record the link state information C in the LSDB of the CSG 101, without ensuring that both the link state information C and the link state information D are recorded in the LSDB of the CSG 101. It can be learned from above that, by adding the third indication identifier to the link state information C, the ASG 103 may indicate, to the CSG 101, whether the CSG 101 is to synchronously update the link state information C and the link state information D. In this way, a processing manner of route updating can be more flexibly configured.

If the link state information C is carried in a third LSA defined according to the OSPF protocol, the third indication identifier may be carried in an LSA header of the third LSA. With reference to the description in IETF RFC 2328, the third LSA may use the LSA header shown in FIG. 3. The third indication identifier may be carried in an options field in the LSA header of the third LSA. With reference to the description in IETF RFC 5250, the options field in the LSA header of the third LSA may use the structure shown in FIG. 4. The EA bit has been explicitly deprecated. Therefore, in the options field in the LSA header of the third LSA, an EA bit may be replaced by an SR bit, and the SR bit is used to carry the third indication identifier. Specifically, if the SR bit in the third LSA is set, the link state information C carries the third indication identifier. If the SR bit in the third LSA is not set, the link state information C does not carry the third indication identifier.

205: If the link state information is the link state information D, the CSG 101 records the link state information D in the LSDB of the CSG 101 when the link state information C has been recorded in the LSDB of the CSG 101.

When receiving the link state information D, the CSG 101 may determine whether the link state information C has been recorded in the LSDB of the CSG 101. If the CSG 101 has received the link state information C at this time, and the link state information C has been recorded in the LSDB of the CSG 101, the CSG 101 may record the link state information D in the LSDB of the CSG 101. If the CSG 101 has not received the link state information C at this time, the CSG 101 records the link state information D in the LSDB of the CSG 101 after the link state information C has been recorded in the LSDB of the CSG 101. In this way, even if the CSG 101 receives the link state information D before the link state information C, the link state information D is recorded in the LSDB of the CSG 101 when the link state information C has been recorded. When the link state information D is recorded in the LSDB, the CSG 101 may compute the route 1 based on the link state information D, replace the route 2 in the routing table by the route 1, and delete the forwarding entry 2 from the forwarding table. In this way, the CSG 101 no longer uses the SR tunnel B to perform traffic forwarding. When the link state information C is recorded in the LSDB, the CSG 101 may record, based on the link state information C, the SID of the CSG 109 for the route 1 in the routing table when the route 1 has been recorded in the routing table. In this way, the CSG 101 can use the SR tunnel A to perform traffic forwarding. Therefore, when the in-order transmission of the link state information C and the link state information D cannot be ensured, even if the CSG 101 receives the link state information D before the link state information C, during a time period in which the CSG 101 receives the link state information D but has not received the link state information C, the CSG 101 can continue to use the SR tunnel B to perform traffic forwarding; and after receiving the link state information C and the link state information D, the CSG 101 can switch the traffic from the SR tunnel B back to the SR tunnel A for forwarding, thereby avoiding a traffic packet loss. In specific implementation, when the CSG 101 receives the link state information D, the CSG 101 may determine whether the link state information C is recorded in the CSG 101 LSDB. If the link state information C has been recorded in the LSDB of the CSG 101, the CSG 101 may also record the link state information D in the LSDB of the CSG 101, so that the CSG 101 may update the route to the CSG 109 based on the link state information D in the LSDB. If the link state information C is not recorded in the LSDB of the CSG 101, the CSG 101 may start a timer, and wait for a preset time. For example, the timer expires and is restarted every one second, and the preset time is reached when the timer expires after being restarted twice, or in other words, the preset time is three seconds. Within the preset time controlled by using the timer, if the CSG 101 receives the link state information C, and records the link state information C in the LSDB of the CSG 101, the CSG 101 may also record the link state information D in the LSDB of the CSG 101. If the CSG 101 has not received the link state information C after the preset time controlled by using the timer, and the link state information C has not been recorded in the LSDB of the CSG 101, the CSG 101 may discard the link state information D.

In some implementations, the link state information D may carry a fourth indication identifier, to indicate the CSG 101 to synchronously record the link state information C and the link state information D in the LSDB. After the CSG 101 receives the link state information D, if the CSG 101 reads the fourth indication identifier from the link state information D, the CSG 101 may record, based on the fourth indication identifier in the link state information D, the link state information D in the LSDB of the CSG 101 after having received the link state information C and recorded the link state information C in the LSDB of the CSG 101. If the CSG 101 cannot read the fourth indication identifier from the link state information D, the CSG 101 may record the link state information D in the LSDB of the CSG 101, without ensuring that the link state information D is recorded in the LSDB when the link state information C has been recorded in the LSDB. It can be learned from above that, by adding the fourth indication identifier to the link state information D, the ASG 103 may indicate, to the CSG 101, whether the CSG 101 is to synchronously update the link state information C and the link state information D. In this way, a processing manner of route updating can be more flexibly configured.

If the link state information D is carried in a fourth LSA defined according to the OSPF protocol, the fourth indication identifier may be carried in an LSA header of the fourth LSA. With reference to the description in IETF RFC 2328, the fourth LSA may use the LSA header shown in FIG. 3. The fourth indication identifier may be carried in an options field in an LSA header of the fourth LSA. With reference to the description in IETF RFC 5250, the options field in the LSA header of the fourth LSA may use the structure shown in FIG. 4. The EA bit has been explicitly deprecated. Therefore, in the options field in the LSA header of the fourth LSA, an EA bit may be replaced by an SR bit, and the SR bit is used to carry the fourth indication identifier. Specifically, if the SR bit in the fourth LSA is set, the link state information D carries the fourth indication identifier. If the SR bit in the fourth LSA is not set, the link state information D does not carry the fourth indication identifier.

In this embodiment, when the in-order transmission of the link state information A and the link state information B cannot be ensured, regardless of whether the CSG 101 receives the link state information A but has not received the link state information B, or the CSG 101 receives the link state information B but has not received the link state information A, the CSG 101 can switch the traffic from the SR tunnel A to the SR tunnel B for forwarding, thereby avoiding the traffic packet loss. In addition, when the in-order transmission of the link state information C and the link state information D cannot be ensured, regardless of whether the CSG 101 receives the link state information C but has not received the link state information D, or the CSG 101 receives the link state information D but has not received the link state information C, the CSG 101 can continue to use the SR tunnel B to perform traffic forwarding; and after receiving the link state information C and the link state information D, the CSG 101 can switch the traffic from the SR tunnel B back to the SR tunnel A for forwarding, thereby avoiding the traffic packet loss.

Figure 5:
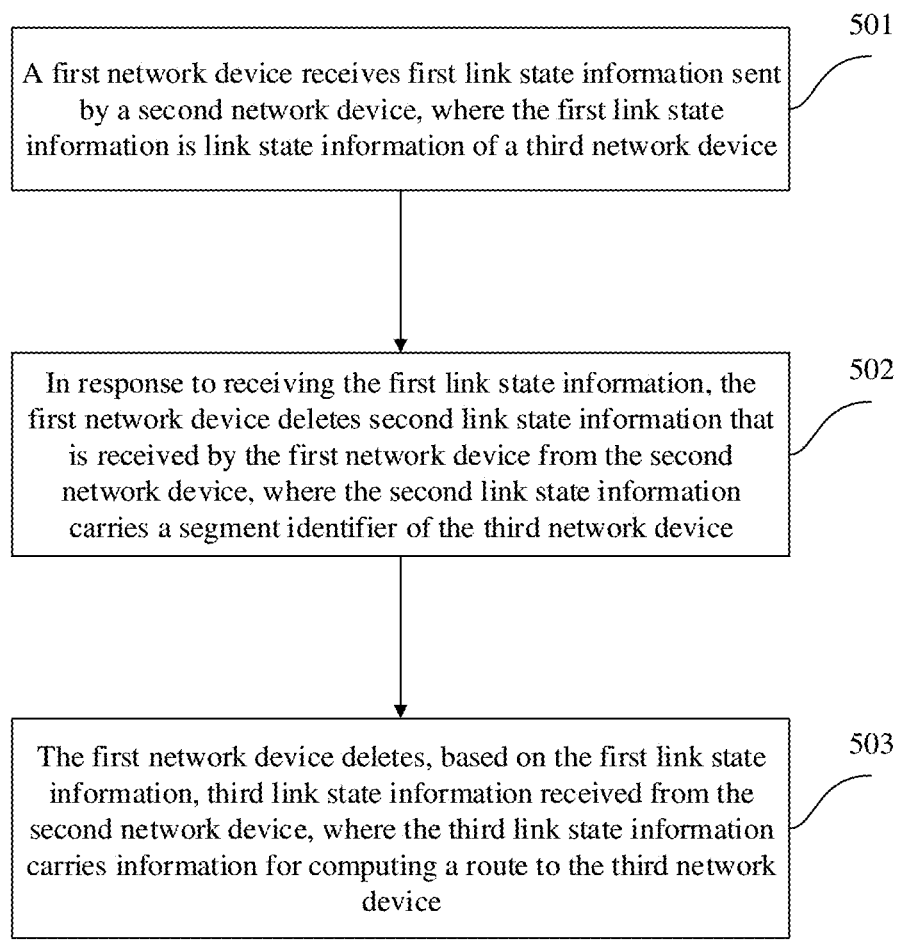
FIG. 5 is a schematic flowchart of a method for processing link state information according to an embodiment of this application.

FIG. 5 is a schematic flowchart of a method for processing link state information according to an embodiment of this application. The method 500 may include the following steps.

501: A first network device receives first link state information sent by a second network device, where the first link state information is information about a third network device.

502: In response to receiving the first link state information, the first network device deletes second link state information that is received by the first network device from the second network device, where the second link state information carries a segment identifier of the third network device.

503: The first network device deletes, based on the first link state information, third link state information received from the second network device, where the third link state information carries link state information for computing a route to the third network device.

It can be understood that the first link state information may be used to indicate the first network device to delete link state information that is about the third network device and that is stored in the first network device, that is, the second link state information and the third link state information. In this case, the first link state information can be considered as information about the third network device.

In some implementations, the first link state information carries an indication identifier, and the indication identifier is used to indicate the network device that receives the first link state information, to delete the third link state information.

In some implementations, that the first network device deletes, based on the first link state information, third link state information received from the second network device includes: The first network device deletes the third link state information when determining that the first link state information carries the indication identifier.

In some implementations, the first link state information is carried in a link-state advertisement (LSA) defined according to the open shortest path first (OSPF) protocol, and the indication identifier is carried in an options field in an LSA header corresponding to the link state information.

It should be noted that the first network device mentioned in the method 500 may be the CSG 101 mentioned in the method 200. The second network device mentioned in the method 500 may be the ASG 103 mentioned in the method 200. The third network device mentioned in the method 500 may be the CSG 109 mentioned in the method 200. The first link state information mentioned in the method 500 may be the link state information A mentioned in the method 200. The second link state information mentioned in the method 500 may be the link state information E mentioned in the method 200. The third link state information mentioned in the method 500 may be the link state information F mentioned in the method 200. The indication identifier mentioned in the method 500 may be the first indication identifier mentioned in the method 200. Therefore, for various specific implementations of the method 500, refer to related descriptions of the method 200. Details are not described again in this embodiment.

Figure 6:
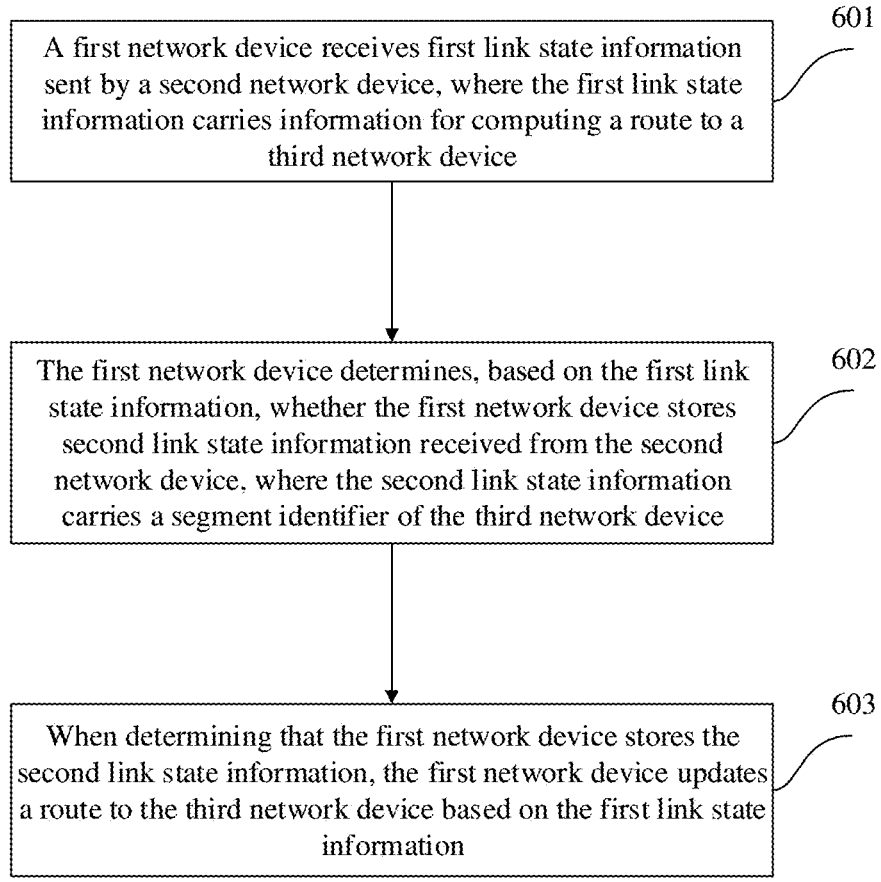
FIG. 6 is a schematic flowchart of a method for processing link state information according to an embodiment of this application.

FIG. 6 is a schematic flowchart of a method for processing link state information according to an embodiment of this application. The method 600 may include the following steps.

601: A first network device receives first link state information sent by a second network device, where the first link state information carries information for computing a route to a third network device.

602: The first network device determines, based on the first link state information, whether the first network device stores second link state information received from the second network device, where the second link state information carries a segment identifier of the third network device.

603: When determining that the first network device stores the second link state information, the first network device updates a route to the third network device based on the first link state information.

In some implementations, the method 600 further includes: The first network device starts a timer when the first network device determines that the first network device does not store the second link state information; and determines, during timing of the timer, whether the first network device receives the second link state information sent by the second network device.

In some implementations, the method 600 further includes: When determining that the first network device receives the second link state information before the timer expires, the first network device updates the route to the third network device based on the first link state information.

In some implementations, the method 600 further includes: When determining that the first network device does not receive the second link state information even after the timer expires, the first network device skips updating the route to the third network device based on the first link state information.

In some implementations, the first link state information carries an indication identifier, and the indication identifier is used to indicate the network device that receives the first link state information, to determine, when updating the route to the third network device based on the first link state information, whether the network device stores the second link state information.

In some implementations, that the first network device determines, based on the first link state information, whether the first network device stores second link state information received from the second network device includes: When determining that the first link state information carries the indication identifier, the first network device determines whether the first network device stores the second link state information.

In some implementations, the first link state information is carried in a link-state advertisement (LSA) defined according to the OSPF protocol, and the indication identifier is carried in an options field in an LSA header of the LSA.

It should be noted that the first network device mentioned in the method 600 may be the CSG 101 mentioned in the method 200. The second network device mentioned in the method 600 may be the ASG 103 mentioned in the method 200. The third network device mentioned in the method 600 may be the CSG 109 mentioned in the method 200. The first link state information mentioned in the method 600 may be the link state information D mentioned in the method 200. The second link state information mentioned in the method 600 may be the link state information C mentioned in the method 200. The indication identifier mentioned in the method 600 may be the fourth indication identifier mentioned in the method 200. Therefore, for various specific implementations of the method 600, refer to related descriptions of the method 200. Details are not described again in this embodiment.

Figure 7:
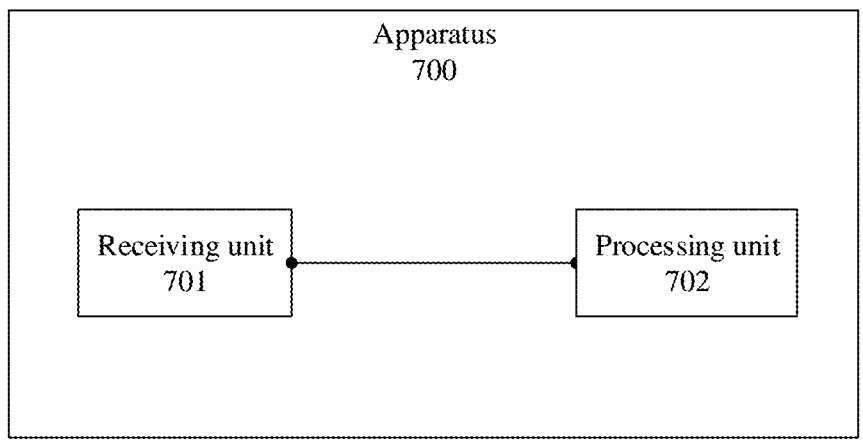
FIG. 7 is a schematic structural diagram of an apparatus for processing link state information according to an embodiment of this application.

FIG. 7 is a schematic structural diagram of an apparatus for processing link state information according to an embodiment of this application. The apparatus 700 is a first network device, and includes: a receiving unit 701, configured to receive first link state information sent by a second network device, where the first link state information is link state information of a third network device; and a processing unit 702, configured to: in response to receiving the first link state information, delete second link state information that is received by the first network device from the second network device, where the second link state information carries a segment identifier of the third network device, where the processing unit 702 is further configured to delete, based on the first link state information, third link state information received from the second network device, where the third link state information carries information for computing a route to the third network device.

In some implementations, the first link state information carries an indication identifier, and the indication identifier is used to indicate the network device that receives the first link state information, to delete the third link state information.

In some implementations, the processing unit 702 is specifically configured to delete the third link state information when it is determined that the first link state information carries the indication identifier.

In some implementations, the first link state information is carried in a link-state advertisement (LSA) defined according to the open shortest path first (OSPF) protocol, and the indication identifier is carried in an options field in an LSA header of the LSA.

It can be understood that the apparatus 700 shown in FIG. 7 may be the CSG 101 mentioned in the method 200 shown in FIG. 2. Therefore, for various specific implementations of the apparatus 700, refer to related descriptions of the method 200. Details are not described again in this embodiment.

Figure 8:
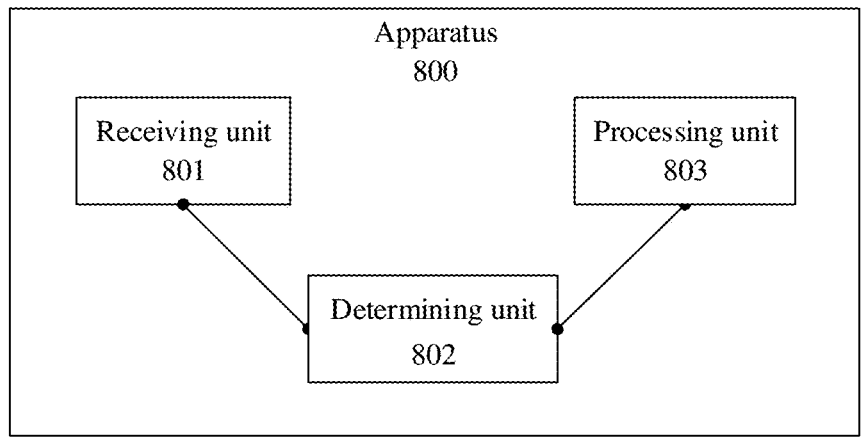
FIG. 8 is a schematic structural diagram of an apparatus for processing link state information according to an embodiment of this application.

FIG. 8 is a schematic structural diagram of an apparatus for processing link state information according to an embodiment of this application. The apparatus 800 is a first network device, and includes: a receiving unit 801, configured to receive first link state information sent by a second network device, where the first link state information carries link state information for computing a route to a third network device; a determining unit 802, configured to determine, based on the first link state information, whether the first network device stores second link state information received from the second network device, where the second link state information carries a segment identifier of the third network device; and a processing unit 803, configured to: when it is determined that the first network device stores the second link state information, update a route to the third network device based on the first link state information.

In some implementations, the processing unit 803 is further configured to start a timer when the determining unit 802 determines that the first network device does not store the second link state information; and the determining unit 802 is further configured to determine, during timing of the timer, whether the first network device receives the second link state information sent by the second network device.

In some implementations, the processing unit 803 is further configured to: when the determining unit 802 determines that the first network device receives the second link state information before the timer expires, update the route to the third network device based on the first link state information.

In some implementations, the processing unit 803 is further configured to: when the determining unit 802 determines that the first network device does not receive the second link state information even after the timer expires, not update the route to the third network device based on the first link state information.

In some implementations, the first link state information carries an indication identifier, and the indication identifier is used to indicate the network device that receives the first link state information, to determine, when updating the route to the third network device based on the first link state information, whether the network device stores the second link state information.

In some implementations, the determining unit 802 is specifically configured to: when determining that the first link state information carries the indication identifier, determine whether the first network device stores the second link state information.

In some implementations, the first link state information is carried in a link-state advertisement (LSA) defined according to the OSPF protocol, and the indication identifier is carried in an options field in an LSA header of the LSA.

It can be understood that the apparatus 800 shown in FIG. 8 may be the CSG 101 mentioned in the method 200 shown in FIG. 2. Therefore, for various specific implementations of the apparatus 800, refer to related descriptions of the method 200. Details are not described again in this embodiment.

Figure 9:
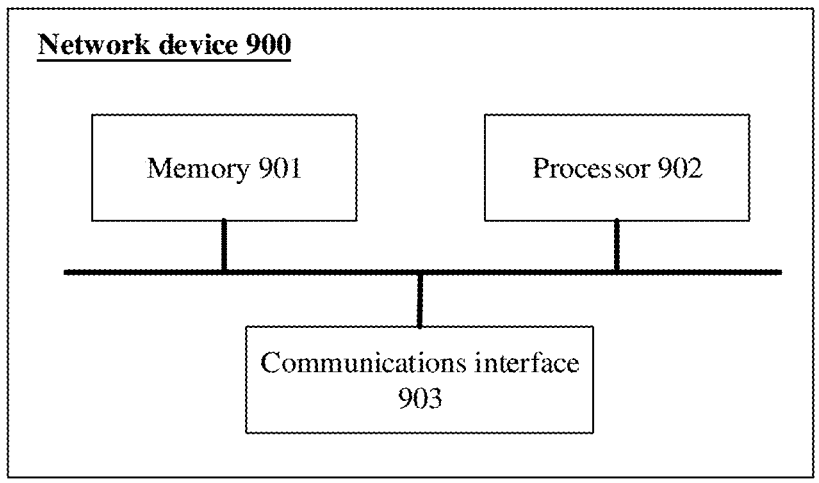
FIG. 9 is a schematic structural diagram of a network device according to an embodiment of this application.

FIG. 9 is a schematic structural diagram of a network device according to an embodiment of this application. The network device 900 includes a memory 901, a processor 902, and a communications interface 903. The memory 901 is configured to store program code. The processor 902 is configured to run instructions in the program code to enable the network device 900 to perform the method according to any implementation of the method 500. The communications interface 903 is configured to send information to another network device or receive information sent by another network device.

Figure 10:
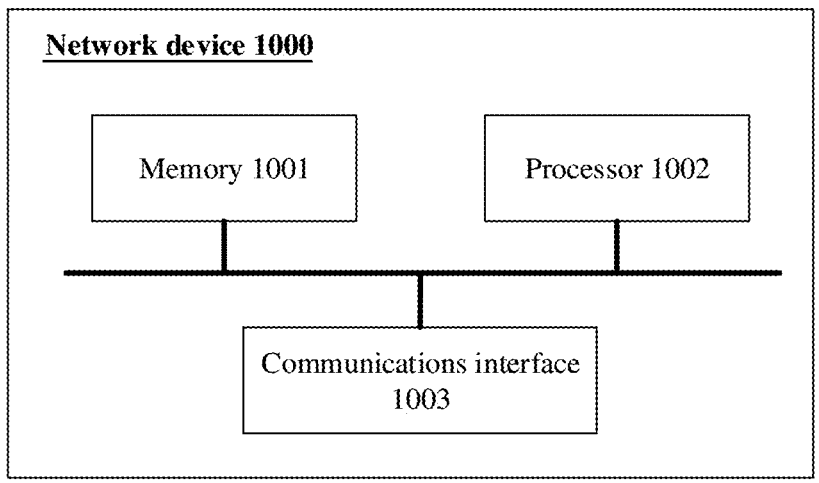
FIG. 10 is a schematic structural diagram of a network device according to an embodiment of this application.

FIG. 10 is a schematic structural diagram of a network device according to an embodiment of this application. The network device woo includes a memory 1001, a processor 1002, and a communications interface 1003. The memory 1001 is configured to store program code. The processor 1002 is configured to run instructions in the program code to enable the network device moo to perform the method according to any implementation of the method 600. The communications interface 1003 is configured to send information to another network device or receive information sent by another network device.

In addition, an embodiment of this application further provides a computer program product. When the computer program product is run on a computer, the computer is enabled to perform the method according to any implementation of the method 500 or the method according to any implementation of the method 600.

In addition, an embodiment of this application further provides a computer-readable storage medium. The computer-readable storage medium stores instructions. When the instructions are run on a computer or a processor, the computer or the processor is enabled to perform the method according to any implementation of the method 500 or the method according to any implementation of the method 600.

"First" in terms such as "first link state information" and "first network device" mentioned in the embodiments of this application is merely used for name identification, and does not represent the first in order. This rule is also applicable to "second" and the like.

From the foregoing descriptions of the implementations, a person skilled in the art may clearly understand that some or all steps of the methods in the embodiments may be implemented by software in addition to a universal hardware platform. Based on such an understanding, the technical solutions of this application may be implemented in a form of a software product. The software product may be stored in a storage medium, such as a read-only memory (ROM)/ RAM, a magnetic disk, or an optical disc, and includes several instructions for instructing a computer device (which may be a personal computer, a server, or a network communications device such as a router) to perform the methods described in the embodiments or some parts of the embodiments of this application.

The embodiments in this specification are all described in a progressive manner, and for same or similar parts in the embodiments, reference may be made to these embodiments, and each embodiment focuses on a difference from other embodiments. Especially, an apparatus embodiment is basically similar to a method embodiment, and therefore is described briefly. For related parts, reference may be made to partial descriptions in the method embodiment. The described apparatus embodiment is merely an example. The modules described as separate parts may or may not be physically separate, and parts displayed as modules may or may not be physical modules, may be located in one position, or may be distributed on a plurality of network units. Some or all the modules may be selected based on actual needs to achieve the objectives of the solutions of the embodiments. A person of ordinary skill in the art may understand and implement the embodiments of this application without creative efforts.

The above descriptions are merely example implementations of this application, and are not intended to limit the protection scope of this application.

What is claimed is:

1. A method, comprising:
   receiving, by a first network device, second link state information from a second network device, wherein the second link state information carries a segment identifier of a third network device;
   in response to receiving the second link state information, recording, by the first network device, a forwarding entry associated with the third network device in a forwarding table;
   receiving, by the first network device, third link state information from the second network device, wherein the third link state information carries information for computing a route to the third network device;
   in response to receiving the third link state information, recording, by the first network device, the route to the third network device in a routing table;
   receiving, by the first network device, first link state information sent by the second network device, wherein the first link state information is link state information of the third network device;
   in response to receiving the first link state information, deleting, by the first network device, the second link state information, wherein the forwarding entry associated with the third network device is deleted from the forwarding table when the second link state information is deleted; and
   deleting, by the first network device based on the first link state information, the third link state information, wherein the route to the third network device is deleted from the routing table when the first link state information is deleted.

2. The method according to claim 1, wherein the first link state information carries an indication identifier, and the indication identifier indicates to a network device that receives the first link state information to delete the third link state information.

3. The method according to claim 2, wherein deleting, by the first network device based on the first link state information, the third link state information received from the second network device comprises:
   deleting the third link state information in response to the first network device determining that the first link state information carries the indication identifier.

4. The method according to claim 2, wherein the first link state information is carried in a link-state advertisement (LSA) defined according to an open shortest path first (OSPF) protocol, and the indication identifier is carried in an options field in a packet header of the LSA.

5. The method according to claim 1, wherein the first network device is a cell site gateway (CSG) and the second network device is an aggregation site gateway (ASG).

6. A first network device, comprising
   at least one processor; and
   one or more memories coupled to the at least one processor and storing instructions for execution by the at least one processor, the instructions comprising instructions that instruct the at least one processor to cause the first network device to:
   receive second link state information from a second network device, wherein the second link state information carries a segment identifier of a third network device;
   in response to receiving the second link state information, record a forwarding entry associated with the third network device in a forwarding table;
   receive third link state information from the second network device, wherein the third link state information carries information for computing a route to the third network device;
   in response to receiving the third link state information, record the route to the third network device in a routing table;
   receive first link state information sent by the second network device, wherein the first link state information is link state information of the third network device;
   in response to receiving the first link state information, delete the second link state information, wherein the forwarding entry associated with the third network device is deleted from the forwarding table when the second link state information is deleted; and
   delete, based on the first link state information, the third link state information, wherein the route to the third network device is deleted from the routing table when the first link state information is deleted.

7. The first network device according to claim 6, wherein the first link state information carries an indication identifier, and the indication identifier indicates to a network device that receives the first link state information to delete the third link state information.

8. The first network device according to claim 7, wherein the instructions further comprise instructions that instruct the at least one processor to cause the first network device to:
   delete the third link state information in response to determining that the first link state information carries the indication identifier.

9. The first network device according to claim 7, wherein the first link state information is carried in a link-state advertisement (LSA) defined according to an open shortest path first (OSPF) protocol, and the indication identifier is carried in an options field in a packet header of the LSA.

10. The first network device according to claim 6, wherein the first network device is a cell site gateway (CSG) and the second network device is an aggregation site gateway (ASG).

11. A non-transitory computer readable storage medium storing instructions by at least one processor, the instructions including instructions for:
receiving second link state information from a second network device, wherein the second link state information carries a segment identifier of a third network device;
in response to receiving the second link state information, recording a forwarding entry associated with the third network device in a forwarding table;
receiving third link state information from the second network device, wherein the third link state information carries information for computing a route to the third network device;
in response to receiving the third link state information, recording the route to the third network device in a routing table;
receiving first link state information sent by the second network device, wherein the first link state information is link state information of the third network device;
in response to receiving the first link state information, deleting the second link state information, wherein the forwarding entry associated with the third network device is deleted from the forwarding table when the second link state information is deleted; and
deleting, based on the first link state information, the third link state information, wherein the route to the third network device is deleted from the routing table when the first link state information is deleted.

12. The non-transitory computer readable storage medium according to claim 11, wherein the first link state information carries an indication identifier, and the indication identifier indicates to a network device that receives the first link state information to delete the third link state information.

13. The non-transitory computer readable storage medium according to claim 12, wherein deleting, based on the first link state information, the third link state information received from the second network device comprises:
deleting the third link state information in response to determining that the first link state information carries the indication identifier.

14. The non-transitory computer readable storage medium according to claim 12, wherein the first link state information is carried in a link-state advertisement (LSA) defined according to an open shortest path first (OSPF) protocol, and the indication identifier is carried in an options field in a packet header of the LSA.

15. A system, comprising:
a first network device; and
a second network device; and
wherein the first network device is configured to:
receive second link state information sent by a second network device, wherein the second link state information carries a segment identifier of a third network device;
in response to receiving the second link state information, record a forwarding entry associated with the third network device in a forwarding table;
receive third link state information sent by the second network device, wherein the third link state information carries information for computing a route to the third network device;
in response to receiving the third link state information, record the route to the third network device in a routing table;
receive first link state information sent by the second network device, wherein the first link state information is link state information of the third network device;
in response to receiving the first link state information, delete the second link state information, wherein the forwarding entry associated with the third network device is deleted from the forwarding table when the second link state information is deleted; and
delete, based on the first link state information, the third link state information, wherein the route to the third network device is deleted from the routing table when the first link state information is deleted.

16. The system according to claim 15, wherein the first link state information carries an indication identifier, and the indication identifier indicates to a network device that receives the first link state information to delete the third link state information.

17. The system according to claim 16, wherein deleting, based on the first link state information, the third link state information received from the second network device comprises:
deleting the third link state information in response to determining that the first link state information carries the indication identifier.

18. The system according to claim 16, wherein the first link state information is carried in a link-state advertisement (LSA) defined according to an open shortest path first (OSPF) protocol, and the indication identifier is carried in an options field in a packet header of the LSA.

19. The system according to claim 15, wherein the first network device is a cell site gateway (CSG) and the second network device is an aggregation site gateway (ASG).

* * * * *